Figure 1:
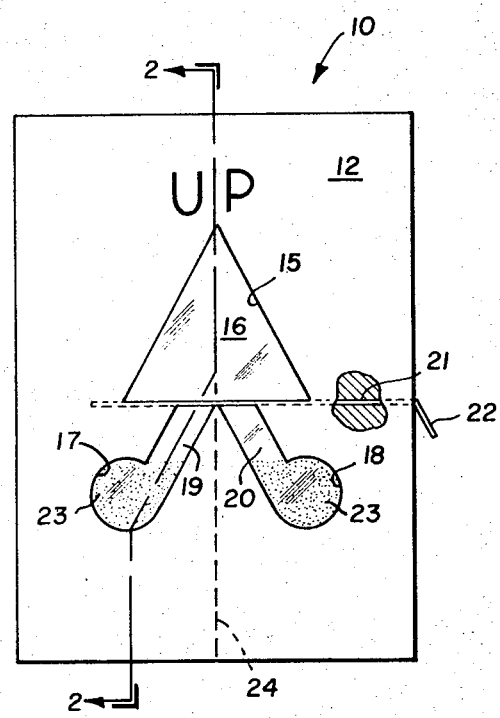

United States Patent

Davis et al.

[15] 3,688,734
[45] Sept. 5, 1972

[54] INVERSION OR TILT INDICATOR

[72] Inventors: George M. Davis, 120 Maywood Ave., Rochester, N.Y. 14618; William M. Lander, 5048 Ridge Road, Horseheads, N.Y. 14845

[22] Filed: Jan. 14, 1972

[21] Appl. No.: 217,858

[52] U.S. Cl. .............................. 116/114 AH, 73/492
[51] Int. Cl. ........................................... G01d 21/00
[58] Field of Search......116/114, 114 AH; 73/11, 12, 73/492, 503

[56] References Cited

UNITED STATES PATENTS 2,768,602   10/1956   Eichholz et al. ....116/114 AH
3,207,122   9/1965   Salembier............116/114 AH
3,467,053   9/1969   Davis et al. .........116/114 AH Primary Examiner—Louis J. Capozi
Attorney—Cumpton, Shaw & Stephens

[57] ABSTRACT

An improved tilt or inversion indicator uses a pair of storage chambers for colored particles that are free to flow through passageways of opposite inclinations from the vertical into an indicator chamber so that one storage chamber empties into the indicator chamber for a tilt in one direction from the vertical, and the other storage chamber empties into the indicator chamber for the opposite tilt from the vertical.

5 Claims, 2 Drawing Figures

PATENTED SEP 5 1972 3,688,734

INVERSION OR TILT INDICATOR

THE INVENTIVE IMPROVEMENT

U.S. Pat. No. 3,467,053 shows an inversion or tilt indicator using a card having an aperture covered with front and rear lamina to contain colored particles in a storage chamber connected by a passageway to an indicator chamber so that if the indicator is tilted or inverted, the particles flow to the indicator chamber where they stick to an adhesive coating on the front lamina and make a permanent indication of the inversion. This indicator is simple and quite effective for indicating a full inversion, or a tilt of 90° or more, but it does not give an indication for a tilt of less than 90°.

The invention involves recognition of the need for a simple device for indicating a tilt of less than 90° while retaining the basic simplicity and economy of the device of U.S. Pat. No. 3,467,053. The invention also involves the discovery of a simple and expedient way to accomplish this.

SUMMARY OF THE INVENTION

The inventive indicator is of the same general type as shown in U.S. Pat. No. 3,467,053, but it uses an improved formation of the card aperture to provide a pair of storage chambers spaced on opposite sides of a vertical line through the indicator chamber when the indicator is upright. A separate passageway leads upward from each storage chamber to the indicator chamber, and the passageways each have an acute angle to the vertical line so that particles can flow from one storage chamber into the indicator chamber during a tilt in one direction from the vertical, and particles can flow from the opposite storage chamber into the indicator chamber during the opposite tilt from the vertical. The inclined passageways also prevent particles from bouncing up into the indicator chamber during upright but bouncing motion.

DRAWINGS

Figure 2:
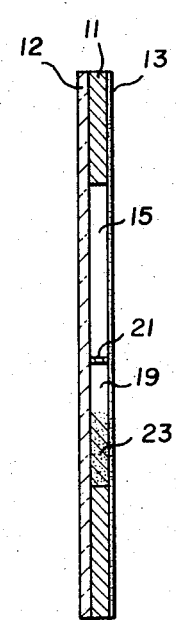

FIG. 1 is a front elevation of a preferred embodiment of the improved indicator; and FIG. 2 is a cross-section of the indicator of FIG. 1 taken along the line 2 — 2 thereof.

Indicator 10 as shown in the drawings is similar to the indicator shown in U.S. Pat. No. 3,467,053. Generally, indicator 10 is formed of an apertured card 11 having a transparent front lamina 12 secured to card 11 to cover the aperture with a pressure-sensitive adhesive face to which indicator particles stick. A rear lamina 13 covers the back of card 11 and has a pressure-sensitive coating for mounting indicator 10 on a package for shipment. The improvement lies in the shape and function of the aperture in card 11, and this is best shown in FIG. 1.

Aperture 15 in card 11 as viewed through front lamina 12 of FIG. 1 includes an indicator chamber 16 preferably shaped as an upright arrowhead, and a pair of storage chambers 17 and 18 below indicator chamber 16. Storage chambers 17 and 18 have respective passageways 19 and 20 leading to indicator chamber 16. The tops of passageways 19 and 20 are closed by a blocking band 21 that extends out of one edge of indicator 10 in a tab 22 that can be gripped for pulling band 21 out of its slot to ready the device for indication. Colored particles 23 are stored in each storage chamber 17 and 18 to effect a visual indication if indicator 10 is inverted or tilted sufficiently. In use, indicator 10 is secured in upright orientation to a package for shipment, and band 21 is removed by pulling on tab 22 so that particles 23 are free to flow through passageways 19 or 20 to indicator chamber 16 if indicator 10 is inverted or tilted.

Passageways 19 and 20 are each inclined upward relative to a central vertical line 24 through indicator chamber 16. Passageways 19 and 20 are then also angled relative to each other, and are preferably angled from 20°–50° to vertical line 24.

The angle in passageways 19 and 20 is important for two reasons. First, particles 23 bouncing vertically upward from storage chamber 17 or 18 strike the inclined walls of passageways 19 and 20 and hence have no free vertical pathway into indicator chamber 16 to make a false tilting or inversion indication from mere upright vertical bouncing. Hence, the angle in passageways 19 and 20 prevents false indication of tilt or inversion. Second, a pair of passageways 19 and 20 each angled to the vertical as illustrated, allows a more sensitive tilt indication than was previously possible. If indicator 10 is tilted clockwise from the position illustrated in FIG. 1, particles 23 flow from storage chamber 17 down passageway 19 and into indicator chamber 16 when the tilt exceeds the complement of the angle between passageway 19 and vertical 24. For an opposite tilt in the counter clockwise direction from the orientation shown in FIG. 1, particles 23 from storage chamber 18, flow down passageway 20 into indicator chamber 16 when such tilt exceeds the complement of the angle between passageway 20 and vertical 24. Both storage chambers 17 and 18 empty completely into indicator chamber 16 on a full inversion.

The angle of passageways 19 and 20 relative to vertical line 24 is preferably at least 20° so that if a package carrying indicator 10 is tilted 90° and laid on its side, particles will readily flow from the uppermost storage chamber 17 or 18 down a 20° incline into indicator chamber 16. The angle between passageways 19 and 20 and vertical lines 24 is also preferably not more than about 50° to allow reasonable tilting without particle flow.

The double storage chamber and angled indicator passageways of indicator 10 have surprising advantages over the previous indicator in having enhanced tilt sensitivity to a tilt in either direction while retaining basic simplicity and economy. One of the indicators 10 mounted on each of two perpendicular vertical walls of a package can indicate a tilt in any direction exceeding a pre-determined angle of for example, about 60°. This gives high security to the shipment of valuable equipment without increasing the cost or complexity of the indicator device.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application, but falling within the spirit of the invention. For example, those skilled in the art will be aware of the materials, shapes, and constructions possible with the inventive indicator.

I claim:

1. In an inversion or tilt indicator having a card with an aperture covered by front and rear lamina to contain colored particles normally held in a storage chamber but free to flow through a passageway to an indicator chamber upon tilting or inversion of said indicator, an improved formation of said aperture card to provide:
   a. a pair of said storage chambers spaced on opposite sides of a vertical line through said indicator chamber when said indicator is upright;
   b. a separate one of said passageways leading upward from each of said storage chambers and communicating with said indicator chamber; and
   c. said passageways each lying at an acute angle to said vertical line so that said particles flow from one of said storage chambers into said indicator chamber for a tilt of said indicator in one direction from the vertical, and said particles flow from the other of said storage chambers into said indicator chamber for a tilt of said indicator in an opposite direction from the vertical.

2. The indicator of claim 1 wherein said acute angles are between 20° and 50°.

3. The indicator of claim 1 wherein said acute angles are equal.

4. The indicator of claim 3 wherein said acute angles are between 20° and 50°.

5. The indicator of claim 4 wherein said acute angles are approximately 30°.

* * * * *